(12) United States Patent
Assarpour

(10) Patent No.: US 8,848,707 B2
(45) Date of Patent: Sep. 30, 2014

(54) METHOD FOR IP LONGEST PREFIX MATCH USING PREFIX LENGTH SORTING

(71) Applicant: Avaya, Inc., Basking Ridge, NJ (US)

(72) Inventor: Hamid Assarpour, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 161 days.

(21) Appl. No.: 13/627,841

(22) Filed: Sep. 26, 2012

(65) Prior Publication Data

US 2014/0086248 A1    Mar. 27, 2014

(51) Int. Cl.
*H04L 12/28* (2006.01)

(52) U.S. Cl.
USPC .......................................... 370/389; 370/392

(58) Field of Classification Search
USPC .................................. 370/392, 389
See application file for complete search history.

(56) References Cited

U.S. PATENT DOCUMENTS

| 7,554,980 | B1* | 6/2009 | Yeh et al. ....................... 370/392 |
| 7,624,226 | B1* | 11/2009 | Venkatachary et al. ...... 711/108 |
| 2004/0100950 | A1* | 5/2004 | Basu et al. ..................... 370/389 |
| 2005/0100012 | A1* | 5/2005 | Kaxiras et al. ................ 370/389 |
| 2009/0150603 | A1* | 6/2009 | Sahni et al. ................... 711/108 |

* cited by examiner

*Primary Examiner* — Sai-Ming Chan
(74) *Attorney, Agent, or Firm* — Anderson Gorecki & Rouille LLP

(57) ABSTRACT

Prefix length memory tables are used to enable fast IPv4 LPM lookups using a single memory access for a first range of IP prefixes, and using two memory accesses for larger IP prefixes. Each of the prefix length memory tables is used to hold a set of forwarding rules associated with a different prefix length range. IP LPM operations are then performed in parallel in each of the prefix length memory tables of the set, and the forwarding rule matching the longest prefix is returned from each of the memory tables. A priority encoder is used to select between positive results from the multiple prefix length memory tables to enable the forwarding rule with the largest matching prefix to be used to key into the next hop forwarding table. The method utilizes low cost DDR SDRAM rather than TCAM, and also exhibits low overhead.

20 Claims, 8 Drawing Sheets

| | | V |
|---|---|---|
| 0000 0000 | | 0 |
| 0000 0001 | Forwarding Rule 1 | 1 |
| 0000 0010 | | 0 |
| 0000 0011 | | 0 |
| 0000 0100 | Forwarding Rule 2 | 1 |
| 0000 0101 | Forwarding Rule 2 | 1 |
| 0000 0110 | Forwarding Rule 2 | 1 |
| 0000 0111 | Forwarding Rule 2 | 1 |
| 0000 1000 | | 0 |

●
●
●

| 1111 1110 | | 0 |
| 1111 1111 | | 0 |

●
●
●

| 0001 0000 | Forwarding Rule 3 | 1 |
| 0001 0001 | Forwarding Rule 3 | 1 |
| 0001 0010 | Forwarding Rule 4 | 1 |
| 0001 0011 | Forwarding Rule 4 | 1 |
| 0001 0100 | Forwarding Rule 3 | 1 |
| 0001 0101 | Forwarding Rule 3 | 1 |
| 0001 0110 | Forwarding Rule 3 | 1 |
| 0001 0111 | Forwarding Rule 3 | 1 |
| 0001 1000 | | 0 |

●
●
●

| 1111 1110 | | 0 |
| 1111 1111 | | 0 |

FIG. 3A

|  |  | V |
|---|---|---|
| 0000 0000 |  | 0 |
| 0000 0001 | Forwarding Rule 1 | 1 |
| 0000 0010 |  | 0 |
| 0000 0011 |  | 0 |
| 0000 0100 | Forwarding Rule 2 | 1 |
| 0000 0101 | Forwarding Rule 2 | 1 |
| 0000 0110 | Forwarding Rule 2 | 1 |
| 0000 0111 | Forwarding Rule 2 | 1 |
| 0000 1000 |  | 0 |

●
●
●

| 1111 1110 |  | 0 |
|---|---|---|
| 1111 1111 |  | 0 |

●
●
●

| 0001 0000 | Forwarding Rule 3 | 1 |
|---|---|---|
| 0001 0001 | Forwarding Rule 3 | 1 |
| 0001 0010 | Forwarding Rule 4 | 1 |
| 0001 0011 | Forwarding Rule 4 | 1 |
| 0001 0100 | Forwarding Rule 3 | 1 |
| 0001 0101 | Forwarding Rule 3 | 1 |
| 0001 0110 | Forwarding Rule 3 | 1 |
| 0001 0111 | Forwarding Rule 3 | 1 |
| 0001 1000 |  | 0 |

●
●
●

| 1111 1110 |  | 0 |
|---|---|---|
| 1111 1111 |  | 0 |

FIG. 3B

| | | V |
|---|---|---|
| 0000 0000 0000 | | 0 |
| 0000 0000 0001 | | 0 |
| 0000 0000 0010 | | 0 |
| 0000 0000 0011 | | 0 |
| 0000 0000 0100 | Forwarding Rule 5 | 1 |
| 0000 0000 0101 | Forwarding Rule 5 | 1 |
| 0000 0000 0110 | Forwarding Rule 6 | 1 |
| 0000 0000 0111 | Forwarding Rule 6 | 1 |
| 0000 0000 1000 | | 0 |

| | | |
|---|---|---|
| 1111 1111 1110 | | 0 |
| 1111 1111 1111 | | 0 |

FIG. 3C

| | | V |
|---|---|---|
| 0000 0000 0000 0000 | | 0 |
| 0000 0000 0000 0001 | | 0 |
| 0000 0000 0000 0010 | Forwarding Rule | 1 |
| 0000 0000 0000 0011 | Forwarding Rule | 1 |
| 0000 0000 0000 0100 | Forwarding Rule | 1 |
| 0000 0000 0000 0101 | Forwarding Rule | 1 |
| 0000 0000 0000 0110 | Forwarding Rule | 1 |
| 0000 0000 0000 0111 | Forwarding Rule | 1 |
| 0000 0000 0000 1000 | | 0 |

⋮

| | | |
|---|---|---|
| 1111 1111 1111 1110 | | 0 |
| 1111 1111 1111 1111 | | 0 |

FIG. 3D

|                          |                | V |
|--------------------------|----------------|---|
| 0000 0000 0000 0000 0000 |                | 0 |
| 0000 0000 0000 0000 0001 |                | 0 |
| 0000 0000 0000 0000 0010 | Forwarding Rule | 1 |
| 0000 0000 0000 0000 0011 | Forwarding Rule | 1 |
| 0000 0000 0000 0000 0100 | Forwarding Rule | 1 |
| 0000 0000 0000 0000 0101 | Forwarding Rule | 1 |
| 0000 0000 0000 0000 0110 | Forwarding Rule | 1 |
| 0000 0000 0000 0000 0111 | Forwarding Rule | 1 |
| 0000 0000 0000 0000 1000 |                | 0 |

•
•
•

|                          |   |
|--------------------------|---|
| 1111 1111 1111 1111 1110 | 0 |
| 1111 1111 1111 1111 1111 | 0 |

FIG. 3F

| | | V |
|---|---|---|
| 0000 0000 0000 0000 0000 0101 0000 0000 | | 0 |
| 0000 0000 0000 0000 0000 0101 0000 0001 | | 0 |
| 0000 0000 0000 0000 0000 0101 0000 0010 | | 0 |
| 0000 0000 0000 0000 0000 0101 0000 0011 | Forwarding Rule 11 | 1 |
| 0000 0000 0000 0000 0000 0101 0000 0100 | | 0 |
| 0000 0000 0000 0000 0000 0101 0000 0101 | | 0 |
| 0000 0000 0000 0000 0000 0101 0000 0110 | | 0 |
| 0000 0000 0000 0000 0000 0101 0000 0111 | Forwarding Rule 12 | 1 |
| 0000 0000 0000 0000 0000 0101 0000 1000 | | 0 |

⋮

| | | |
|---|---|---|
| 0000 0000 0000 0000 0000 0101 1111 1110 | | 0 |
| 0000 0000 0000 0000 0000 0101 1111 1111 | | 0 |

FIG. 4

| | | V |
|---|---|---|
| 0000 0000 0000 0000 0000 0111 0000 0000 | | 0 |
| 0000 0000 0000 0000 0000 0111 0000 0001 | | 0 |
| 0000 0000 0000 0000 0000 0111 0000 0010 | Forwarding Rule 13 | 1 |
| 0000 0000 0000 0000 0000 0111 0000 0011 | Forwarding Rule 14 | 1 |
| 0000 0000 0000 0000 0000 0111 0000 0100 | | 0 |
| 0000 0000 0000 0000 0000 0111 0000 0101 | Forwarding Rule 15 | 1 |
| 0000 0000 0000 0000 0000 0111 0000 0110 | | 0 |
| 0000 0000 0000 0000 0000 0111 0000 0111 | Forwarding Rule 16 | 1 |
| 0000 0000 0000 0000 0000 0111 0000 1000 | | 0 |

⋮

| | | |
|---|---|---|
| 0000 0000 0000 0000 0000 0111 1111 1110 | | 0 |
| 0000 0000 0000 0000 0000 0111 1111 1111 | | 0 |

METHOD FOR IP LONGEST PREFIX MATCH USING PREFIX LENGTH SORTING

CROSS-REFERENCE TO RELATED APPLICATIONS

None.

BACKGROUND

1. Field

This application relates to network elements and, more particularly, to a method for performing IP longest prefix match using prefix length sorting.

2. Description of the Related Art

Data communication networks may include various switches, nodes, routers, and other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

Network elements are designed to handle packets of data efficiently, to minimize the amount of delay associated with transmission of the data on the network. Conventionally, this is implemented by using hardware in a data plane of the network element to forward packets of data, while using software in a control plane of the network element to configure the network element to cooperate with other network elements on the network. For example, a network element may include a routing process, which runs in the control plane, that enables the network element to have a synchronized view of the network topology so that the network element is able to forward packets of data across the network toward its intended destination. Multiple processes may be running in the control plane to enable the network element to interact with other network elements on the network and forward data packets on the network.

The applications running in the control plane make decisions about how particular types of traffic should be handled by the network element to allow packets of data to be properly forwarded on the network. As these decisions are made, the control plane programs the hardware in the dataplane to enable the dataplane to be adjusted to properly handle traffic as it is received. The data plane includes ASICs, FPGAs, and other hardware elements designed to receive packets of data, perform lookup operations on specified fields of packet headers, and make forwarding decisions as to how the packet should be transmitted on the network. Lookup operations are typically implemented using tables and registers containing entries populated by the control plane.

Internet Protocol (IP) version 4 (IPv4) specifies a 32 bit addressing scheme to allow packets of data to be addressed on a network. A router will read the IP address, perform an IP lookup to determine a set of output ports, and forward the packet out the identified set of output ports toward its destination.

Although IPv4 addresses have 32 bits, not all of the bits may be relevant to a router when making a forwarding decision. For example, a given range of IP addresses may be commonly located within a particular sub-network area, such that all traffic addressed to an IP address within the range of IP addresses should be commonly forwarded by a router toward the subnet. In this situation, the less significant bits of the IP address are not relevant to the forwarding decision and, hence, the router may make a forwarding decision by looking only at the more significant bits of the IP address.

An IP address may therefore be viewed as having an address and a prefix length, e.g. address/16 would indicate that the prefix is 16 bits long such that only the 16 most significant bits of the address have forwarding significance. Since the entire range of IP addresses associated with the /16 prefix will be commonly forwarded out the same set of ports, the router may ignore the 16 least significant bits. The prefix thus specifies a range of IP addresses since all IP addresses with the same prefix will be forwarded according to the forwarding rule associated with the prefix. For example, a /16 bit prefix would represent a range of 64K IP addresses.

Since it is possible to have sub-ranges associated with different forwarding operations, a router will commonly implement a forwarding decision by looking for the longest prefix of the IP address which matches a routing entry in the forwarding table. This allows more specific routing information to take precedence over more general routing information. For example, a router may have a forwarding rule that packets matching a particular /16 prefix should be forwarded on a first set of ports, but that a sub-range of IP addresses matching a particular /24 prefix should be forwarded to a different destination on a second set of ports. Accordingly, when a router receives a packet, it performs a lookup operation to determine the longest prefix in its forwarding tables that matches the IP address contained in the packet. A lookup of this nature is referred to as Longest Prefix Match (LPM).

There are two common methods to implement hardware-based LPM lookup. The first method uses Ternary Content Addressable Memory (TCAM). A TCAM is a fully-associative memory that can store 0, 1 and don't care bits. In a single clock cycle, a TCAM chip finds the longest prefix that matches the address of the incoming packet by searching all stored prefixes in parallel. The issue with this method is that TCAM has high power consumption, poor scalability and higher cost compared to other memory technologies.

The second method is based on a multibit trie representation of a prefix table. In a multibit trie, one or more bits are scanned in a fixed or variable strides to direct the branching of the children. For example, a first lookup may use the first 4 bits of the IP address, the next two bits may then be used for a secondary lookup, etc., until the tree is traversed. The issue with this method is lookup latency. Since all memory accesses to traverse the tree are sequential, implementing an IP LPM using a multibit trie may require 6-10 memory accesses, which delays forwarding of the packet by the network element. Although latency and power consumption may be reduced by using very fast Static Random Access Memory, the latency gets worse when less expensive DDR2/3/4 SDRAM is used instead of SRAMs.

SUMMARY OF THE DISCLOSURE

The following Summary, and the Abstract set forth at the end of this application, are provided herein to introduce some concepts discussed in the Detailed Description below. The Summary and Abstract sections are not comprehensive and are not intended to delineate the scope of protectable subject matter which is set forth by the claims presented below.

An IP longest prefix match method utilizes prefix length sorting to enable fast IPv4 longest prefix match lookups using a single memory access for a first range of IP prefixes, and using two memory accesses for larger IP prefixes. A set of prefix length memory tables are used to hold sets of forwarding rules based on prefix length. Each of the prefix length memory tables holds rules associated with a different prefix length range. IP longest prefix match operations are then performed in parallel in each of the prefix length memory tables of the set, and the forwarding rule matching the longest prefix is returned from each of the memory tables. A priority encoder is used to select between positive results from the multiple prefix length memory tables to enable the forwarding rule with the largest matching prefix to be used to key into the next hop forwarding table. The method utilizes low cost DDR SDRAM rather than TCAM, and also exhibits low overhead.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

FIGS. 3A-3F and FIG. 4 are functional block diagrams showing portions of the data structures of FIG. 2 in greater detail.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, a set of prefix length memory tables are used to hold sets of forwarding rules based on prefix length. Each of the prefix length memory tables holds rules associated with a different prefix length range. IP longest prefix match operations are then performed in parallel in each of the prefix length memory tables of the set, and the forwarding rule matching the longest prefix is returned from each of the memory tables. A priority encoder is used to select between positive results from the multiple prefix length memory tables to enable the forwarding rule with the largest matching prefix to be used to key into the next hop forwarding table.

Figure 1:
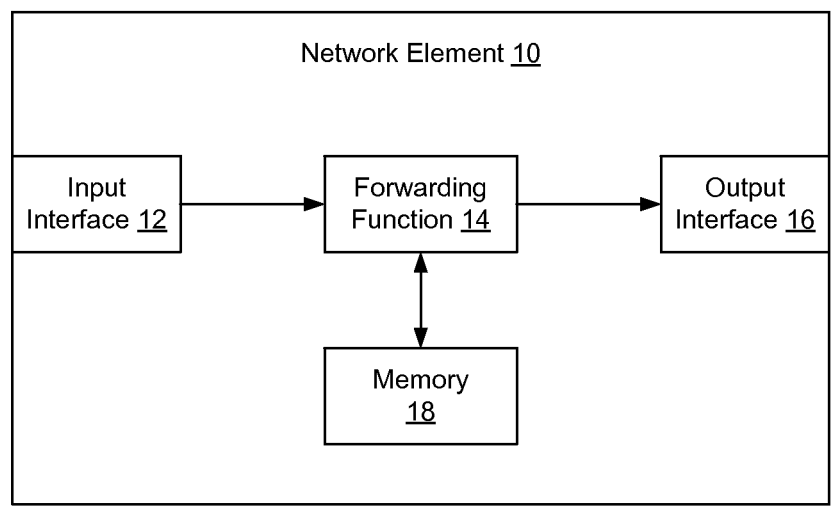
FIG. 1 is a functional block diagram of an example network.

FIG. 1 is a functional block diagram of an example network element. As shown in FIG. 1, in its simplest form, a network element includes an input interface 12 to receive packets of data from a communication network, a forwarding function 12 to make forwarding decisions, and an output interface 16 to forward the packet over one or more ports onto the communication network. The forwarding function, in one embodiment, is designed to perform Internet Protocol Version 4 (IPv4) lookup operations in memory 18. Memory 18 contains entries implementing a set of forwarding rules, and forwarding function 14 uses the memory to determine a set of output ports associated with the forwarding rule matching the longest prefix of a packet's IPv4 address.

Figure 2:
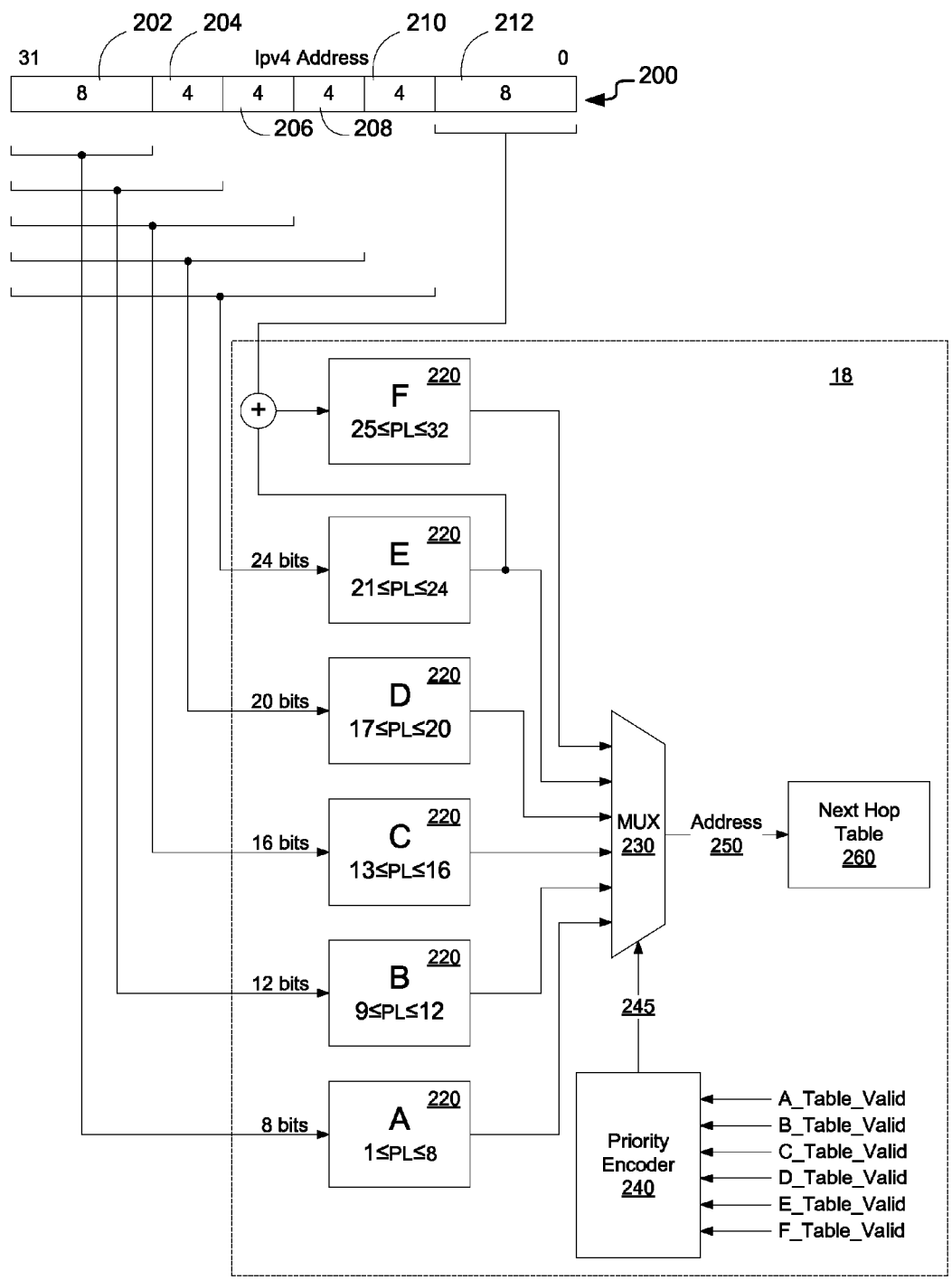
FIG. 2 is a functional block diagram of data structures implemented in memory of an example network element.

FIG. 2 shows an example of the memory 18 in greater detail, and also illustrates how the memory uses fields of the IP address of a packet to perform a longest prefix match operation according to an embodiment. As shown in FIG. 2, the 32 bit IPv4 address 200 is broken into regions 202-212. In the illustrated example, the IPv4 address is broken into six regions—an 8 bit region 202 containing the 8 most significant bits (31-24), a 4 bit region 204 containing bits 23-20, a 4 bit region 206 containing bits 19-16, a 4 bit region 208 containing bits 15-12, a 4 bit region 210 containing bits 11-8, and an 8 bit region 212 containing bits 7-0. Although an embodiment will be explained using this particular set of regions, other embodiments may be implemented using multiple regions having somewhat different sizes than the selected set of sizes shown in FIG. 2.

As shown in FIG. 2, memory 18 includes a set of prefix length memory tables 220, each of which is used to hold forwarding rules with a range of prefix lengths. IP LPM searches are performed in each of the prefix length memory tables in parallel and the outputs are passed to Multiplexer 230. A priority encoder 240 instructs the multiplexer 230 to output a select one of the inputs as the address 250 which is used to key into next hop forwarding table 260 to determine an output set of ports for the input IP address. The result is returned from memory 18 to forwarding function 14 to allow IP packets received at input interface 12 to be forwarded over a set of output ports via output interface 16.

Prefix length memory tables 220, labeled A-E in FIG. 2, are implemented using Double Data Rate Synchronous Dynamic Random-Access Memory (DDR SDRAM), and are used to hold forwarding rules according to prefix length. Since DDR-SDRAM is able to be used to implement these tables, the use of expensive and high power consumption TCAM may be avoided. Since multiple search tables are searched in parallel, prefix length matching for a large range of prefix lengths may be implemented using a single memory access.

The prefix length memory tables 220 A-E each hold forwarding rules associated with a particular range of prefix lengths. In the illustrated embodiment, prefix length memory table A is used to hold forwarding rules associated with prefix lengths of 8 bits or less. Prefix length memory table B is used to hold forwarding rules associated with prefix lengths of between 9 and 12 bits. Prefix length memory table C is used to hold forwarding rules associated with prefix lengths of between 13 and 16 bits. Prefix length memory table D is used to hold forwarding rules associated with prefix lengths of between 17 and 20 bits. Prefix length memory table E is used to hold forwarding rules associated with prefix lengths of between 21 and 24 bits. The particular ranges of prefix lengths may be adjusted, but the illustrated set efficiently uses commercially available DDR memory chip sets. The regions of IP address 200 discussed above correspond to the prefix length ranges of the prefix length memory tables 220.

Each of the prefix length memory tables includes a list of IP addresses and forwarding rules associated with the IP addresses. For example, prefix length memory table A is designed to hold forwarding rules pertaining to prefix lengths of up to 8 bits. Accordingly, memory table A includes 256 entries sorted from binary 0000 0000 to 1111 1111. A forwarding rule associated with an 8 bit prefix would be entered against a single entry in the table, whereas a forwarding rule associated with a smaller prefix would be entered against multiple entries in the table.

For example, FIG. 3A shows a subset of the entries of prefix length memory table A and shows how an example set of forwarding rules may be implemented. In FIG. 3, it will be assumed that Forwarding Rule 1 applies to /8 prefix (0000 0001) and that Forwarding Rule 2 applies to /6 prefix (0000 01). As shown in FIG. 3, there is only one entry in prefix length memory table A matching /8 prefix (0000 0001). There are four entries in prefix length memory table A which match /6 prefix (0000 01). Accordingly, Forwarding Rule 2 is entered in memory table A against each of these entries.

The forwarding rules are implemented such that more specific forwarding rules take precedence over less specific forwarding rules. For example, as shown in FIG. 3A, forwarding rule 3 is associated with a /5 prefix (0001 0), and forwarding rule 4 is associated with /7 prefix (0001 001). Inclusion of forwarding rule 3 affects 8 entries in prefix length memory table A since there are 8 entries which start with 0001 0. However, the more specific /7 forwarding rule continues to be applied to a subset of the entries which match both the /5 and /7 prefixes.

Each of the prefix length memory tables implements forwarding rules of different prefix lengths. For example, FIG. 3B shows an example subset of entries of prefix length memory table B which is designed to implement forwarding rules for prefix lengths of between 9 and 12 bits. As shown in FIG. 3B, the prefix length memory table B has a larger number of entries (4K entries) ordered from (0000 0000 0000) to (1111 1111 1111).

FIG. 3B shows how two example forwarding rules may be implemented. The first forwarding rule (forwarding rule 5) is associated with a /10 prefix (0000 0000 01). If that was the only forwarding rule, it would be entered against each of the 4 entries matching this /10 prefix. However, in this example, forwarding rule 6 is associated with a /11 prefix (0000 0000 011). This forwarding rule has been entered against each of the 2 entries matching this /11 prefix which overlaps a subset of the entries matching forwarding rule 5. Since more specific forwarding rules take precedence over less specific (shorter prefix) forwarding rules, forwarding rule 6 has been entered against each of the two entries matching this /11 prefix.

When an IP address lookup is to be performed, the relevant portion of the IP address is passed to each of the prefix length memory tables A-E. Specifically, since prefix length memory table A implements forwarding rules associated with prefixes of up to 8 bits in length, only the first 8 bits of the IP address are relevant to performing a lookup in table A. Accordingly, when a lookup is to be performed, the 8 most significant bits of the IP address are used to key into prefix length memory table A to determine whether any forwarding rules are associated with that IP address.

Likewise, prefix length memory table B implements forwarding rules having applicability to prefix lengths between 9 and 12 bits. Accordingly, the first 12 bits of the IP address are passed to prefix length memory table B to enable a determination to be made, for the IP address, as to whether any forwarding rules associated with prefix length between 9 and 12 bits is applicable to the IP address.

The first 16 bits are passed to prefix length memory table C, the first 20 bits are passed to prefix length memory table D, and the first 24 bits are passed to prefix length memory table E. A lookup operation is performed, in parallel, in each of the prefix length memory tables to enable a determination to be made as to whether any forwarding rules associated with up to /24 prefix length are applicable to the IP address.

Figure 3E:
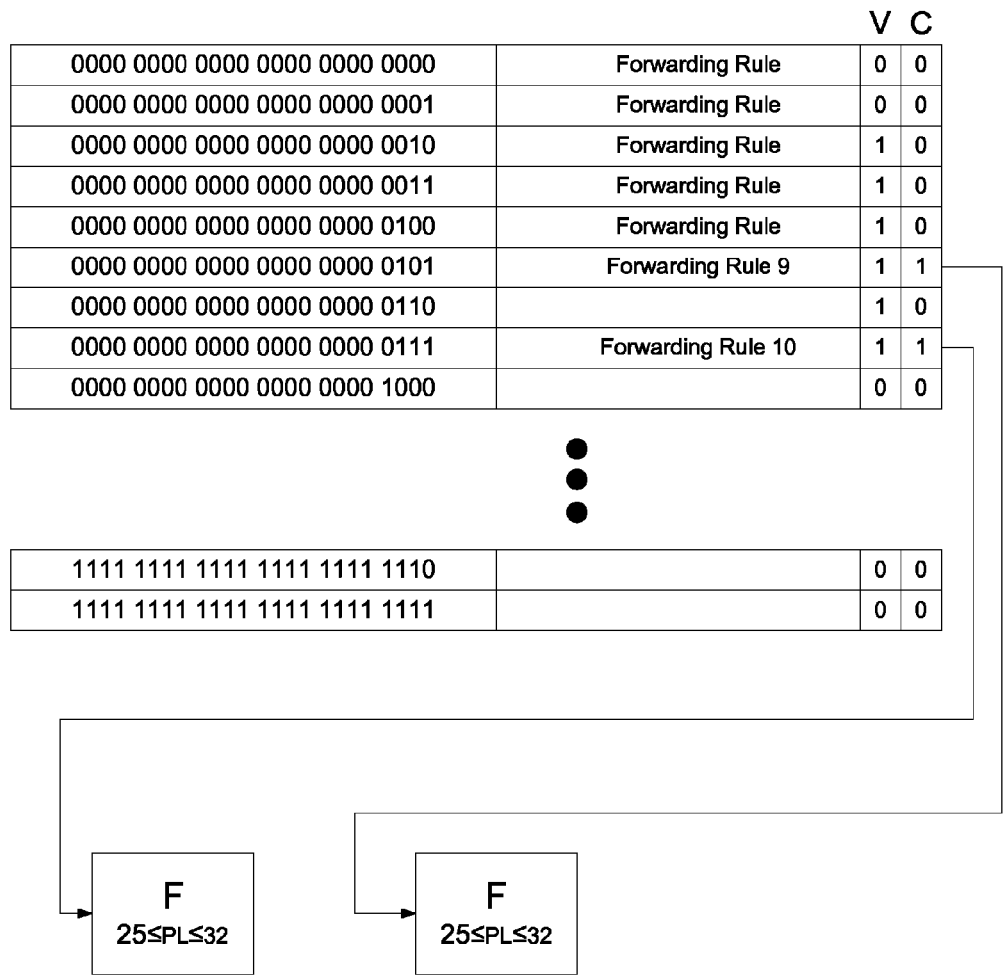

FIGS. 3C, 3D, and 3E show example prefix length memory tables C, D, and E, respectively. As shown in these examples, the prefix length memory tables include up to $2^n$ entries, where n is the number of bits of the largest prefix associated with the range of prefixes stored in that prefix length memory table. However, each of the tables only has a valid bit set where there is a forwarding rule associated with a prefix length that falls within the range of rules maintained by the table. This minimizes the number of entries that must be changed when rules are entered, since entry of a forwarding rule is only required in the prefix length memory table that is designed to store forwarding rules of that prefix length. For example, a forwarding rule with a /16 prefix length affects a total of 64K addresses. To implement this forwarding rule, only the entries in table C must be updated. Thus, to implement this forwarding rule, only one entry in table C must be updated. The forwarding entry will not appear in tables D and E, to thus minimize the number of entries that must be updated whenever a forwarding rule is entered or deleted.

In the example discussed above, the prefix length memory tables were described as containing a full set of entries (e.g. 0000 0000 to 1111 1111). However, in another embodiment the tables are sparsely populated, in that entries without an associated forwarding rule may be omitted and are not included in the table.

There are situations where prefix exceeding 24 bits in length may be associated with a forwarding rule. This situation is not typical, particularly for core routers. To enable longer prefix rules to be implemented, a set of secondary prefix length memory tables F are implemented. The secondary prefix length memory tables F include entries for each IP address. If a rule associated with a prefix longer than 24 is installed in the secondary prefix length memory tables F, an entry with the 24 most significant bits matching the longer prefix rule will be installed in prefix length memory table E and a continue bit C will be set in the forwarding rule identifying that a further search operation should be implemented in one of the secondary prefix length memory tables F. For example, if a forwarding rule with /26 prefix (0000 1111 0000 1111 0000 1111 01) is to be set in secondary prefix length memory tables F, the /24 entry (0000 1111 0000 1111 0000 1111) will be set in prefix length memory table E and the continue flag will be set for that /24 entry, to indicate that a further search should be performed to find a longer prefix forwarding rule in one of the secondary prefix length memory tables F.

If the continue bit C is set, one of the secondary prefix length memory tables F associated with the forwarding rule will be selected and the final 8 bits of the IP address will be used to key into the selected secondary prefix length memory table F (F table) to determine the longest prefix match for the IP address.

In one embodiment, there are 16M entries in the E table. In one embodiment, a corresponding set of 16M F tables, one per entry, is formed. Each of the F tables includes 64 entries for each of the possible 64 combinations based on the last 8 bits of the IP address. Thus, a full set of IP addresses is able to be specified using the F tables such that forwarding rules having prefixes of up to /32 are supported by the memory. FIG. 3F shows one example F table for entry (0000 0000 0000 0000 0101 of FIG. 3E, and FIG. 4 shows another example F table for entry (0000 0000 0000 0000 0111) of FIG. 3E.

In another embodiment, fewer than a full set of 16M F tables is created, such that an F table is only created if necessary. Stated differently, memory is allocated to contain forwarding rules only when a forwarding rule associated with greater than a /24 prefix is to be implemented on the network element.

In still another embodiment, multiple F tables may be grouped together such that one or a small subset of F tables may be used to contain forwarding rules having a prefix length greater than 24 bits.

When an IP address is received, the first 8 bits of the IP address are passed to prefix length memory table A. Similarly, the first 12 bits of the IP address are passed to prefix length memory table B, the first 16 bits of the IP address are passed to the prefix length memory table C, the first 20 bits of the IP address are passed to the prefix length memory table D, and the first 24 bits of the IP address are passed to the prefix length memory table E. Lookups are performed in each of the prefix length memory tables A-E in parallel to find rules in each of the tables that are associated with the longest prefix match within that table. Each table returns the forwarding rule with the longest prefix match that has a valid bit V set. The valid bit V is a value that is set when a forwarding rule matching the prefix is implemented in the prefix length memory table.

Outputs of the tables are passed to a multiplexer 230. A priority encoder 240 receives inputs from each of the prefix length memory tables A-E. Specifically, the priority encoder receives an input associated with each table indicating that a rule was found in the table which had a valid bit V set. The priority encoder selects the table with the longest prefix length range and provides an input 245 to the multiplexer 230 to cause the multiplexer to pass the forwarding rule (address) 250 to the next hop table 260. The next hop table uses the input address to determine a set of output ports for the address and returns the set of addresses to the forwarding function 14 to enable the packet to be forwarded on toward its destination on the network.

According to an embodiment, each prefix length memory table is directly indexed by corresponding portion of the IP address matching its prefix length. If a prefix length falls within a region, then all entries associated with the prefix address range in that particular prefix length sort table are updated to the same value. By keeping the range of prefix lengths stored within each of the tables to a relatively small number, e.g. 4 bits, the number of entries to be updated during an add prefix operation may be constrained to be relatively low, e.g. up to 8 entries, to thus minimize the amount of time required to update memories as forwarding rules change.

The lookup operations in each of the memory tables A-E are implemented in parallel, thus implementing in parallel lookups for forwarding rules that match prefixes of up to 24 bits in length. If a prefix match longer than 24 bits exist, memory table E will return a positive result (valid flag V set) along with an indication that a further lookup should be implemented in one of the memory tables F (the continue flag C in the entry will be set). In this case, the lookup will take two memory accesses. However, in most instances the lookup will be implemented using a single memory access cycle. A priority encoder is used to select between positive results from the multiple prefix length memory tables to enable the forwarding rule with the largest matching prefix to be used to key into the next hop forwarding table.

The functions described herein may be embodied as a software program implemented in control logic on a processor on the network element or may be configured as a FPGA or other processing unit on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible non-transitory computer-readable medium such as a random access memory, cache memory, read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of Internet Protocol (IP) longest prefix match, the computer program comprising a set of instructions which, when executed by a computer, cause the computer to perform a method comprising the steps of:
   implementing a set of prefix length memory tables, each of the prefix length memory tables storing forwarding rules associated with a unique range of prefix lengths;
   performing an IP longest prefix match on an IP address in each of the set of prefix length memory tables in parallel to return a set of prefix matches; and
   selecting the IP longest prefix match from the set of prefix matches;
   wherein the step of performing the IP longest prefix match on the IP address is implemented in each of the set of prefix length memory tables in parallel in a single memory access operation.

2. The non-transitory tangible computer readable storage medium of claim 1, wherein each forwarding rule is inserted into at most one of the prefix length memory tables associated with the unique range of prefix lengths encompassing a prefix length of the forwarding rule.

3. The non-transitory tangible computer readable storage medium of claim 1, wherein the IP address is a 32 bit Internet Protocol version 4 (IPv4) address.

4. The non-transitory tangible computer readable storage medium of claim 1, wherein the set of prefix length memory tables includes six prefix length memory tables, each of the six prefix length memory tables storing forwarding rules with a disjoint range of prefix lengths.

5. The non-transitory tangible computer readable storage medium of claim 1, wherein the set of prefix length memory tables includes a first prefix length memory table to hold forwarding rules associated with prefixes up to a first number of bits, a second prefix length memory table to hold forwarding rules associated with prefixes from the first number of bits plus 1 to a second number of bits, a third prefix length memory table to hold forwarding rules associated with prefixes from the second number of bits plus 1 to a third number of bits, and a fourth prefix length memory table to hold forwarding rules associated with prefixes from the third number of bits plus 1 to a fourth number of bits.

6. A non-transitory tangible computer readable storage medium having stored thereon a computer program for implementing a method of Internet Protocol (IP) longest prefix match, the computer program comprising a set of instructions which, when executed by a computer, cause the computer to perform a method comprising the steps of:
   implementing a set of prefix length memory tables, each of the prefix length memory tables storing forwarding rules associated with a unique range of prefix lengths;
   performing an IP longest prefix match on an IP address in each of the set of prefix length memory tables in parallel to return a set of prefix matches; and selecting the IP longest prefix match from the set of prefix matches;

wherein the step of performing an IP longest prefix match on an IP address in parallel in each of the set of prefix length memory tables comprises passing a corresponding number of most significant bits of the IP address to each of the prefix length memory tables, the corresponding number for each of the prefix length memory table depending on the highest range of prefix lengths handled by that prefix length memory table.

7. A non-transitory tangible computer readable storage medium having stored thereon a computer program for implementing a method of Internet Protocol (IP) longest prefix match, the computer program comprising a set of instructions which, when executed by a computer, cause the computer to perform a method comprising the steps of:

implementing a set of prefix length memory tables, each of the prefix length memory tables storing forwarding rules associated with a unique range of prefix lengths;

performing an IP longest prefix match on an IP address in each of the set of prefix length memory tables in parallel to return a set of prefix matches; and selecting the IP longest prefix match from the set of prefix matches;

wherein the step of selecting the IP longest prefix match from the set of prefix matches comprises receiving an indication of a longest prefix match with a valid bit set from at least two of the set of prefix length memory tables, and selecting the longest prefix match from one of the at least two of the set of prefix length memory tables configured to store forwarding rules with longer prefixes.

8. A non-transitory tangible computer readable storage medium having stored thereon a computer program for implementing a method of Internet Protocol (IP) longest prefix match, the computer program comprising a set of instructions which, when executed by a computer, cause the computer to perform a method comprising the steps of:

implementing a set of prefix length memory tables, each of the prefix length memory tables storing forwarding rules associated with a unique range of prefix lengths;

performing an IP longest prefix match on an IP address in each of the set of prefix length memory tables in parallel to return a set of prefix matches;

selecting the IP longest prefix match from the set of prefix matches; and implementing a set of secondary prefix length memory tables containing entries associated with forwarding rules having prefix lengths exceeding a maximum prefix length range of the set of prefix length memory tables.

9. The non-transitory tangible computer readable storage medium of claim 8, wherein the maximum prefix length range of the set of prefix length memory tables is 24 bits.

10. The non-transitory tangible computer readable storage medium of claim 8, the method further comprising the step of performing an IP longest prefix match on the IP address in a selected one of the set of secondary prefix length memory tables.

11. The non-transitory tangible computer readable storage medium of claim 10, wherein the step of performing the IP longest prefix match on the IP address is implemented in each of the set of prefix length memory tables in parallel in a single memory access operation, and wherein the step of performing the IP longest prefix match on the IP address in a selected one of the set of secondary prefix length memory tables is implemented in a separate memory access operation.

12. The non-transitory tangible computer readable storage medium of claim 11, wherein the separate memory access operation is a subsequent memory access operation.

13. The non-transitory tangible computer readable storage medium of claim 1, the method further comprising the step of using a value associated with the selected IP longest prefix match to key into an IP next hop forwarding table.

14. The non-transitory tangible computer readable storage medium of claim 7, wherein the step of performing the IP longest prefix match on the IP address is implemented in each of the set of prefix length memory tables in parallel in a single memory access operation.

15. A network element, comprising:

an input interface, a forwarding function, a memory, and an output interface, the forwarding function interacting with the memory to make forwarding decisions in connection with receipt of packets on the input interface and forwarding of the packets on the output interface;

wherein the memory contains a set of data structures, the set of data structures comprising:

a first data structure containing a first set of forwarding rules associated with a first range of prefix lengths, the first range of prefix lengths being associated with forwarding rules of up to a first number of bits;

a second data structure containing a second set of forwarding rules associated with a second range of prefix lengths, the second range of prefix lengths being disjoint from the first range and encompassing prefix lengths being associated with forwarding rules of the first number of bits plus 1 to a second number of bits; and a third data structure containing a third set of forwarding rules associated with a third range of prefix lengths, the third range of prefix lengths being disjoint from the first and second ranges and encompassing prefix lengths being associated with forwarding rules of the second number of bits plus 1 to a third number of bits;

wherein the memory is configured to implement an IP longest prefix match on the IP address is implemented in each of the first, second, and third data structures in parallel in a single memory access operation.

16. The network element of claim 15, wherein the set of data structures further comprises:

a fourth data structure containing a fourth set of forwarding rules associated with a fourth range of prefix lengths, the fourth range of prefix lengths being disjoint from the first through third ranges and encompassing prefix lengths being associated with forwarding rules of the third number of bits plus 1 to a fourth number of bits;

a fifth data structure containing a fifth set of forwarding rules associated with a fifth range of prefix lengths, the fifth range of prefix lengths being disjoint from the first through fourth ranges and encompassing prefix lengths being associated with forwarding rules of the fourth number of bits plus 1 to a fifth number of bits.

17. The network element of claim 16, further comprising a set of secondary prefix length memory tables containing entries associated with forwarding rules having prefix lengths exceeding the fifth number of bits.

18. The network element of claim 1, wherein the first number of bits is 8, the second number of bits is 12, the third number of bits is 16, the fourth number of bits is 20, and the fifth number of bits is 24.

19. The network element of claim 15, further comprising a multiplexer configured to receive inputs from each of the data structures in connection with performance of an Internet Protocol version 4 (IPv4) Longest Prefix Match operation, and output an address to a data structure implementing a next hop forwarding table.

20. The network element of claim 19, wherein the multiplexer is under the control of a priority encoder, the priority encoder being configured to preference selection of a valid entry from a data structure containing longer prefix lengths.

* * * * *